United States Patent
Kang et al.

(10) Patent No.: US 12,411,617 B1
(45) Date of Patent: Sep. 9, 2025

(54) MEMORY SYSTEM INCLUDING ECC ENGINE

(71) Applicant: SK hynix Inc., Gyeonggi-do (KR)

(72) Inventors: Seong Yoon Kang, Gyeonggi-do (KR); Mun Seon Jang, Gyeonggi-do (KR); Sang Uhn Cha, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/739,334

(22) Filed: Jun. 11, 2024

(30) Foreign Application Priority Data

Mar. 6, 2024 (KR) .......... 10-2024-0031974

(51) Int. Cl.
*G06F 3/06* (2006.01)

(52) U.S. Cl.
CPC .......... *G06F 3/0619* (2013.01); *G06F 3/0655* (2013.01); *G06F 3/0673* (2013.01)

(58) Field of Classification Search
CPC ..... G06F 3/0619; G06F 3/0655; G06F 3/0673
See application file for complete search history.

(56) References Cited

U.S. PATENT DOCUMENTS

| | | | | |
|---|---|---|---|---|
| 5,425,038 A * | 6/1995 | Chen | ............ | H03M 13/15 |
| | | | | 714/755 |
| 5,563,894 A * | 10/1996 | Fujiwara | ............ | G06F 11/1028 |
| | | | | 714/753 |
| 2020/0119754 A1 * | 4/2020 | Kim | ............ | G06F 11/1068 |
| 2022/0368351 A1 * | 11/2022 | Jeong | ............ | H03M 13/1575 |

FOREIGN PATENT DOCUMENTS

KR 10-2024-0052583 A 4/2024

* cited by examiner

*Primary Examiner* — Jason W Blust
(74) *Attorney, Agent, or Firm* — IP & T GROUP LLP

(57) ABSTRACT

A memory system may include a memory core; and an ECC engine configured to, during a write operation, perform a logical operation on an M-bit write data and an H matrix, and generate an N-bit first error correction code and an N-bit second error correction code to be stored in the memory core together with the write data, where N is an integer of 2 or more and M is a multiple of N. The H matrix may include an upper matrix having a size of N*(M+2N) and a lower matrix having a size of N*(M+2N), the lower matrix may include M/N $T^k$ companion matrices each having a size of N*N, and k of the $T^k$ companion matrices may have values which are positive integers different by N or more for each companion matrix.

13 Claims, 20 Drawing Sheets

|  | DS0 | | | | DS1 | | | | DS2 | | | | DS3 | | | | ES0 | | | | ES1 | | | |
|---|---|---|---|---|---|---|---|---|---|---|---|---|---|---|---|---|---|---|---|---|---|---|---|---|
|  | D0 | D1 | D2 | D3 | D4 | D5 | D6 | D7 | D8 | D9 | D10 | D11 | D12 | D13 | D14 | D15 | E0 | E1 | E2 | E3 | E4 | E5 | E6 | E7 |
| EQUATION 1 | 1'D0 | 0'D1 | 0'D2 | 0'D3 | 1'D4 | 0'D5 | 0'D6 | 0'D7 | 1'D8 | 0'D9 | 0'D10 | 0'D11 | 1'D12 | 0'D13 | 0'D14 | 0'D15 | 1'E0 | 0'E1 | 0'E2 | 0'E3 | 0'E4 | 0'E5 | 0'E6 | 0'E7 | = 0
| EQUATION 2 | 0'D0 | 1'D1 | 0'D2 | 0'D3 | 0'D4 | 1'D5 | 0'D6 | 0'D7 | 0'D8 | 1'D9 | 0'D10 | 0'D11 | 0'D12 | 1'D13 | 0'D14 | 0'D15 | 0'E0 | 1'E1 | 0'E2 | 0'E3 | 0'E4 | 0'E5 | 0'E6 | 0'E7 | = 0
| EQUATION 3 | 0'D0 | 0'D1 | 1'D2 | 0'D3 | 0'D4 | 0'D5 | 1'D6 | 0'D7 | 0'D8 | 0'D9 | 1'D10 | 0'D11 | 0'D12 | 0'D13 | 1'D14 | 0'D15 | 0'E0 | 0'E1 | 1'E2 | 0'E3 | 0'E4 | 0'E5 | 0'E6 | 0'E7 | = 0
| EQUATION 4 | 0'D0 | 0'D1 | 0'D2 | 1'D3 | 0'D4 | 0'D5 | 0'D6 | 1'D7 | 0'D8 | 0'D9 | 0'D10 | 1'D11 | 0'D12 | 0'D13 | 0'D14 | 1'D15 | 0'E0 | 0'E1 | 0'E2 | 1'E3 | 0'E4 | 0'E5 | 0'E6 | 0'E7 | = 0
| EQUATION 5 | 0'D0 | 0'D1 | 0'D2 | 0'D3 | 0'D4 | 0'D5 | 0'D6 | 0'D7 | 1'D8 | 1'D9 | 1'D10 | 1'D11 | 1'D12 | 1'D13 | 1'D14 | 1'D15 | 0'E0 | 0'E1 | 0'E2 | 0'E3 | 1'E4 | 0'E5 | 0'E6 | 0'E7 | = 0
| EQUATION 6 | 1'D0 | 1'D1 | 1'D2 | 1'D3 | 1'D4 | 1'D5 | 1'D6 | 1'D7 | 0'D8 | 0'D9 | 0'D10 | 0'D11 | 0'D12 | 0'D13 | 0'D14 | 0'D15 | 0'E0 | 0'E1 | 0'E2 | 0'E3 | 0'E4 | 1'E5 | 0'E6 | 0'E7 | = 0
| EQUATION 7 | 0'D0 | 1'D1 | 0'D2 | 1'D3 | 0'D4 | 1'D5 | 0'D6 | 1'D7 | 0'D8 | 1'D9 | 0'D10 | 1'D11 | 0'D12 | 1'D13 | 0'D14 | 1'D15 | 0'E0 | 0'E1 | 0'E2 | 0'E3 | 0'E4 | 0'E5 | 1'E6 | 0'E7 | = 0
| EQUATION 8 | 0'D0 | 0'D1 | 1'D2 | 1'D3 | 0'D4 | 0'D5 | 1'D6 | 1'D7 | 0'D8 | 0'D9 | 1'D10 | 1'D11 | 0'D12 | 0'D13 | 1'D14 | 1'D15 | 0'E0 | 0'E1 | 0'E2 | 0'E3 | 0'E4 | 0'E5 | 0'E6 | 1'E7 | = 0

| | DS0 | | | | DS1 | | | | DS2 | | | | DS3 | | | | ES0 | | | | ES1 | | | | |
|---|---|---|---|---|---|---|---|---|---|---|---|---|---|---|---|---|---|---|---|---|---|---|---|---|---|
| | D0 | D1 | D2 | D3 | D4 | D5 | D6 | D7 | D8 | D9 | D10 | D11 | D12 | D13 | D14 | D15 | E0 | E1 | E2 | E3 | E4 | E5 | E6 | E7 | |
| EQUATION 9  | 1'D0' | 0'D1' | 0'D2' | 0'D3' | 0'D4' | 0'D5' | 0'D6' | 0'D7' | 0'D8' | 0'D9' | 0'D10' | 0'D11' | 0'D12' | 0'D13' | 0'D14' | 0'D15' | 1'E0' | 0'E1' | 0'E2' | 0'E3' | 0'E4' | 0'E5' | 0'E6' | 0'E7' | = S0 |
| EQUATION 10 | 0'D0' | 1'D1' | 0'D2' | 0'D3' | 0'D4' | 0'D5' | 0'D6' | 0'D7' | 0'D8' | 0'D9' | 0'D10' | 0'D11' | 0'D12' | 0'D13' | 0'D14' | 0'D15' | 0'E0' | 1'E1' | 0'E2' | 0'E3' | 0'E4' | 0'E5' | 0'E6' | 0'E7' | = S1 |
| EQUATION 11 | 0'D0' | 0'D1' | 1'D2' | 0'D3' | 0'D4' | 0'D5' | 0'D6' | 0'D7' | 0'D8' | 0'D9' | 0'D10' | 0'D11' | 0'D12' | 0'D13' | 0'D14' | 0'D15' | 0'E0' | 0'E1' | 1'E2' | 0'E3' | 0'E4' | 0'E5' | 0'E6' | 0'E7' | = S2 |
| EQUATION 12 | 0'D0' | 0'D1' | 0'D2' | 1'D3' | 0'D4' | 0'D5' | 0'D6' | 0'D7' | 0'D8' | 0'D9' | 0'D10' | 0'D11' | 0'D12' | 0'D13' | 0'D14' | 0'D15' | 0'E0' | 0'E1' | 0'E2' | 1'E3' | 0'E4' | 0'E5' | 0'E6' | 0'E7' | = S3 |
| EQUATION 13 | 0'D0' | 0'D1' | 0'D2' | 0'D3' | 1'D4' | 0'D5' | 0'D6' | 0'D7' | 1'D8' | 0'D9' | 0'D10' | 0'D11' | 1'D12' | 0'D13' | 0'D14' | 0'D15' | 0'E0' | 0'E1' | 0'E2' | 0'E3' | 1'E4' | 0'E5' | 0'E6' | 0'E7' | = S4 |
| EQUATION 14 | 0'D0' | 0'D1' | 0'D2' | 0'D3' | 0'D4' | 1'D5' | 0'D6' | 0'D7' | 0'D8' | 1'D9' | 0'D10' | 0'D11' | 0'D12' | 1'D13' | 0'D14' | 0'D15' | 0'E0' | 0'E1' | 0'E2' | 0'E3' | 0'E4' | 1'E5' | 0'E6' | 0'E7' | = S5 |
| EQUATION 15 | 0'D0' | 0'D1' | 0'D2' | 0'D3' | 0'D4' | 0'D5' | 1'D6' | 0'D7' | 0'D8' | 0'D9' | 1'D10' | 0'D11' | 0'D12' | 0'D13' | 1'D14' | 0'D15' | 0'E0' | 0'E1' | 0'E2' | 0'E3' | 0'E4' | 0'E5' | 1'E6' | 0'E7' | = S6 |
| EQUATION 16 | 0'D0' | 0'D1' | 0'D2' | 0'D3' | 0'D4' | 0'D5' | 0'D6' | 1'D7' | 0'D8' | 0'D9' | 0'D10' | 1'D11' | 0'D12' | 0'D13' | 0'D14' | 1'D15' | 0'E0' | 0'E1' | 0'E2' | 0'E3' | 0'E4' | 0'E5' | 0'E6' | 1'E7' | = S7 |

| | DS0 | | | | DS1 | | | | DS2 | | | | DS3 | | | | ES0 | | | | ES1 | | | | Syndrome |
|---|---|---|---|---|---|---|---|---|---|---|---|---|---|---|---|---|---|---|---|---|---|---|---|---|---|
| | 1 | 1 | 1 | 1 | 1 | 1 | 1 | 1 | 1 | 0 | 0 | 1 | 1 | 1 | 1 | 1 | 0 | 0 | 0 | 0 | 1 | 1 | 0 | 1 | S0=0 |
| | 1 | 0 | 0 | 0 | 0 | 0 | 0 | 0 | 0 | 0 | 1 | 0 | 0 | 0 | 1 | 0 | 1 | 0 | 0 | 0 | 0 | 0 | 0 | 0 | S1=1 |
| | 0 | 1 | 0 | 0 | 0 | 1 | 0 | 0 | 0 | 1 | 0 | 0 | 0 | 1 | 0 | 0 | 0 | 0 | 1 | 0 | 0 | 0 | 0 | 0 | S2=1 |
| | 0 | 0 | 1 | 0 | 0 | 0 | 1 | 0 | 0 | 0 | 0 | 0 | 0 | 0 | 0 | 1 | 0 | 0 | 0 | 0 | 0 | 0 | 0 | 0 | S3=0 |
| | 0 | 0 | 0 | 1 | 0 | 0 | 0 | 1 | 1 | 1 | 0 | 0 | 1 | 0 | 0 | 1 | 0 | 0 | 0 | 0 | 1 | 0 | 0 | 0 | S4=1 |
| | 0 | 1 | 0 | 0 | 1 | 1 | 0 | 0 | 1 | 1 | 0 | 0 | 1 | 1 | 0 | 1 | 0 | 0 | 0 | 0 | 0 | 1 | 0 | 0 | S5=0 |
| | 0 | 0 | 1 | 0 | 0 | 0 | 1 | 0 | 1 | 0 | 1 | 0 | 1 | 0 | 1 | 0 | 0 | 0 | 0 | 0 | 0 | 0 | 1 | 0 | S6=1 |
| | 1 | 0 | 0 | 0 | 0 | 0 | 0 | 1 | 0 | 0 | 0 | 1 | 0 | 0 | 0 | 0 | 0 | 0 | 0 | 0 | 0 | 0 | 0 | 1 | S7=0 |

ERROR

$$T1 = \begin{bmatrix} \alpha^1 & \alpha^2 & \dots & \alpha^\gamma \end{bmatrix} \quad Tj = \begin{bmatrix} \alpha^j & \alpha^{j+1} & \dots & \alpha^{j+\gamma-1} \end{bmatrix}$$

FIG. 12A $$T^i =$$
$$\begin{bmatrix} a^1 \ a^2 \ a^3 \ \ldots \ a^{16} \end{bmatrix}$$
$$=$$

| 0 | 0 | 0 | 0 | 0 | 0 | 0 | 0 | 0 | 0 | 0 | 0 | 0 | 0 | 0 | 1 |
|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 1 |
| 0 | 1 | 0 | 0 | 0 | 0 | 0 | 0 | 0 | 0 | 0 | 0 | 0 | 0 | 0 | 0 |
| 0 | 0 | 1 | 0 | 0 | 0 | 0 | 0 | 0 | 0 | 0 | 0 | 0 | 0 | 0 | 1 |
| 0 | 0 | 0 | 1 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 1 | 0 | 0 | 0 | 1 |
| 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 1 | 0 |

FIG. 12B $$T^2 = \begin{bmatrix} \alpha^2 & \alpha^3 & \alpha^4 & \ldots & \alpha^{17} \end{bmatrix} =$$

| 0 | 0 | 0 | 0 | 0 | 0 | 0 | 0 | 0 | 0 | 0 | 0 | 0 | 0 | 1 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 1 | 1 |
| 1 | 0 | 0 | 0 | 0 | 0 | 0 | 0 | 0 | 0 | 0 | 0 | 0 | 0 | 0 | 1 |
| 0 | 1 | 0 | 0 | 0 | 0 | 0 | 0 | 0 | 0 | 0 | 0 | 0 | 0 | 1 | 0 |
| 0 | 0 | 1 | 0 | 0 | 0 | 0 | 0 | 0 | 0 | 0 | 0 | 0 | 0 | 0 | 1 |
| 0 | 0 | 0 | 1 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 1 | 0 | 0 | 0 | 1 | 0 |
| 0 | 0 | 0 | 0 | 0 | 0 | 0 | 0 | 0 | 0 | 0 | 1 | 0 | 0 | 0 | 1 |
| 0 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 1 | 0 | 0 |

FIG. 12C $$T^3 = \begin{bmatrix} a^3 & a^4 & a^5 & \ldots & a^{18} \end{bmatrix} =$$

| 0 | 0 | 0 | 0 | 0 | 0 | 0 | 0 | 0 | 0 | 0 | 0 | 0 | 1 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 0 | 1 | 1 | 0 |
| 0 | 0 | 0 | 0 | 0 | 0 | 0 | 0 | 0 | 0 | 0 | 0 | 0 | 0 | 1 | 1 |
| 1 | 0 | 0 | 0 | 0 | 0 | 0 | 0 | 0 | 0 | 0 | 0 | 0 | 1 | 0 | 1 |
| 0 | 1 | 0 | 0 | 0 | 0 | 0 | 0 | 0 | 0 | 0 | 0 | 0 | 0 | 1 | 0 |
| 0 | 0 | 1 | 0 | 0 | 0 | 0 | 0 | 0 | 0 | 0 | 0 | 0 | 0 | 0 | 1 |
| 0 | 0 | 0 | 1 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 1 | 0 | 0 | 0 | 1 | 0 | 0 |
| 0 | 0 | 0 | 0 | 0 | 0 | 0 | 0 | 0 | 0 | 1 | 0 | 0 | 0 | 1 | 0 |
| 0 | 0 | 0 | 0 | 0 | 0 | 0 | 0 | 0 | 0 | 0 | 1 | 0 | 0 | 0 | 1 |
| 0 | 0 | 0 | 0 | 0 | 0 | 0 | 0 | 0 | 0 | 0 | 0 | 1 | 0 | 0 | 0 |

FIG. 12D $$T^4_{ii} = \begin{bmatrix} a^4 & a^5 & a^6 & \ldots & a^{19} \end{bmatrix}_{ii}$$

| 0 | 0 | 0 | 0 | 0 | 0 | 0 | 0 | 0 | 0 | 0 | 0 | 1 | 0 | 0 | 0 |
|---|---|---|---|---|---|---|---|---|---|---|---|---|---|---|---|
| 0 | 0 | 0 | 0 | 0 | 0 | 0 | 0 | 0 | 0 | 0 | 0 | 1 | 1 | 0 | 0 |
| 0 | 0 | 0 | 0 | 0 | 0 | 0 | 0 | 0 | 0 | 0 | 0 | 0 | 1 | 1 | 0 |
| 0 | 0 | 0 | 0 | 0 | 0 | 0 | 0 | 0 | 0 | 0 | 0 | 1 | 0 | 1 | 1 |
| 1 | 0 | 0 | 0 | 0 | 0 | 0 | 0 | 0 | 0 | 0 | 0 | 1 | 0 | 0 | 1 |
| 0 | 1 | 0 | 0 | 0 | 0 | 0 | 0 | 0 | 0 | 0 | 0 | 0 | 1 | 0 | 0 |
| 0 | 0 | 1 | 0 | 0 | 0 | 0 | 0 | 0 | 0 | 0 | 0 | 0 | 0 | 0 | 1 |
| 0 | 0 | 0 | 1 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 1 | 0 | 0 | 0 |
| 0 | 0 | 0 | 0 | 0 | 0 | 0 | 0 | 0 | 1 | 0 | 0 | 0 | 1 | 0 | 0 |
| 0 | 0 | 0 | 0 | 0 | 0 | 0 | 0 | 0 | 0 | 1 | 0 | 0 | 0 | 1 | 0 |
| 0 | 0 | 0 | 0 | 0 | 0 | 0 | 0 | 0 | 0 | 0 | 1 | 0 | 0 | 0 | 1 |

FIG. 12E $$T^5 = [\alpha^5 \ \alpha^6 \ \alpha^7 \ ... \ \alpha^{20}]$$

| 0 | 0 | 0 | 0 | 0 | 0 | 0 | 0 | 0 | 0 | 0 | 1 | 0 | 0 | 0 | 1 |
|---|---|---|---|---|---|---|---|---|---|---|---|---|---|---|---|
| 0 | 0 | 0 | 0 | 0 | 0 | 0 | 0 | 0 | 0 | 0 | 1 | 1 | 0 | 0 | 1 |
| 0 | 0 | 0 | 0 | 0 | 0 | 0 | 0 | 0 | 0 | 0 | 0 | 1 | 1 | 0 | 0 |
| 0 | 0 | 0 | 0 | 0 | 0 | 0 | 0 | 0 | 0 | 0 | 1 | 0 | 1 | 1 | 1 |
| 0 | 0 | 0 | 0 | 0 | 0 | 0 | 0 | 0 | 0 | 0 | 0 | 1 | 0 | 1 | 1 |
| 1 | 0 | 0 | 0 | 0 | 0 | 0 | 0 | 0 | 0 | 0 | 0 | 0 | 1 | 0 | 1 |
| 0 | 1 | 0 | 0 | 0 | 0 | 0 | 0 | 0 | 0 | 0 | 0 | 0 | 0 | 1 | 0 |
| 0 | 0 | 1 | 0 | 0 | 0 | 0 | 0 | 0 | 0 | 0 | 0 | 0 | 0 | 0 | 1 |
| 0 | 0 | 0 | 1 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 1 | 0 | 0 | 1 | 0 | 0 | 0 | 0 | 1 |
| 0 | 0 | 0 | 0 | 0 | 0 | 0 | 0 | 1 | 0 | 0 | 0 | 1 | 0 | 0 | 0 |
| 0 | 0 | 0 | 0 | 0 | 0 | 0 | 0 | 0 | 1 | 0 | 0 | 0 | 1 | 0 | 0 |
| 0 | 0 | 0 | 0 | 0 | 0 | 0 | 0 | 0 | 0 | 1 | 0 | 0 | 0 | 1 | 0 |

FIG. 12F $$T^{500}$$
$$=$$
$$\begin{bmatrix} \alpha^{500} & \alpha^{501} & \alpha^{502} & \ldots & \alpha^{515} \end{bmatrix}$$
$$=$$

| 0 | 1 | 0 | 1 | 0 | 0 | 1 | 1 | 1 | 0 | 1 | 0 | 0 | 0 | 0 | 1 |
|---|---|---|---|---|---|---|---|---|---|---|---|---|---|---|---|
| 1 | 1 | 1 | 1 | 1 | 0 | 1 | 0 | 0 | 1 | 1 | 1 | 0 | 0 | 0 | 1 |
| 0 | 1 | 1 | 1 | 1 | 1 | 0 | 1 | 0 | 0 | 1 | 1 | 1 | 0 | 0 | 0 |
| 0 | 1 | 1 | 0 | 1 | 1 | 0 | 1 | 0 | 0 | 1 | 1 | 1 | 1 | 0 | 1 |
| 1 | 0 | 1 | 1 | 0 | 1 | 1 | 0 | 1 | 0 | 0 | 1 | 1 | 1 | 1 | 0 |
| 1 | 1 | 0 | 1 | 1 | 0 | 1 | 1 | 0 | 1 | 0 | 0 | 1 | 1 | 1 | 1 |
| 0 | 1 | 1 | 0 | 1 | 1 | 0 | 1 | 1 | 0 | 1 | 0 | 0 | 1 | 1 | 1 |
| 0 | 0 | 1 | 1 | 0 | 1 | 1 | 0 | 1 | 1 | 0 | 1 | 0 | 0 | 1 | 1 |
| 1 | 0 | 0 | 1 | 1 | 0 | 1 | 1 | 0 | 1 | 1 | 0 | 1 | 0 | 0 | 1 |
| 0 | 1 | 0 | 0 | 1 | 1 | 0 | 1 | 1 | 0 | 1 | 1 | 0 | 1 | 0 | 0 |
| 1 | 0 | 1 | 0 | 0 | 1 | 1 | 0 | 1 | 1 | 0 | 1 | 1 | 0 | 1 | 0 |
| 1 | 1 | 0 | 1 | 0 | 0 | 1 | 0 | 0 | 1 | 1 | 0 | 1 | 1 | 0 | 1 |
| 0 | 0 | 1 | 1 | 1 | 0 | 1 | 0 | 0 | 0 | 0 | 1 | 0 | 1 | 1 | 0 |
| 1 | 1 | 0 | 1 | 1 | 1 | 0 | 1 | 0 | 0 | 0 | 0 | 1 | 0 | 1 | 1 |
| 0 | 1 | 0 | 0 | 1 | 1 | 0 | 1 | 0 | 0 | 0 | 0 | 1 | 0 | 1 |
| 1 | 0 | 1 | 0 | 0 | 1 | 1 | 1 | 0 | 1 | 0 | 0 | 0 | 0 | 1 | 0 |

FIG. 12G $$T^{65534}=$$

$$\left[\alpha^{65534}\ \alpha^0\ \alpha^1\ \alpha^2\ ...\ \alpha^{14}\right]$$

| 1 | 1 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|
| 0 | 0 | 1 | 0 | 0 | 0 | 0 | 0 | 0 | 0 | 0 | 0 | 0 | 0 | 0 | 0 |
| 1 | 0 | 0 | 1 | 0 | 0 | 0 | 0 | 0 | 0 | 0 | 0 | 0 | 0 | 0 | 0 |
| 0 | 0 | 0 | 0 | 1 | 0 | 0 | 0 | 0 | 0 | 0 | 0 | 0 | 0 | 0 | 0 |
| 0 | 0 | 0 | 0 | 0 | 1 | 0 | 0 | 0 | 0 | 0 | 0 | 0 | 0 | 0 | 0 |
| 0 | 0 | 0 | 0 | 0 | 0 | 1 | 0 | 0 | 0 | 0 | 0 | 0 | 0 | 0 | 0 |
| 0 | 0 | 0 | 0 | 0 | 0 | 0 | 1 | 0 | 0 | 0 | 0 | 0 | 0 | 0 | 0 |
| 0 | 0 | 0 | 0 | 0 | 0 | 0 | 0 | 1 | 0 | 0 | 0 | 0 | 0 | 0 | 0 |
| 0 | 0 | 0 | 0 | 0 | 0 | 0 | 0 | 0 | 1 | 0 | 0 | 0 | 0 | 0 | 0 |
| 0 | 0 | 0 | 0 | 0 | 0 | 0 | 0 | 0 | 0 | 1 | 0 | 0 | 0 | 0 | 0 |
| 0 | 0 | 0 | 0 | 0 | 0 | 0 | 0 | 0 | 0 | 0 | 1 | 0 | 0 | 0 | 0 |
| 1 | 0 | 0 | 0 | 0 | 0 | 0 | 0 | 0 | 0 | 0 | 0 | 1 | 0 | 0 | 0 |
| 0 | 0 | 0 | 0 | 0 | 0 | 0 | 0 | 0 | 0 | 0 | 0 | 0 | 1 | 0 | 0 |
| 0 | 0 | 0 | 0 | 0 | 0 | 0 | 0 | 0 | 0 | 0 | 0 | 0 | 0 | 1 | 0 |
| 0 | 0 | 0 | 0 | 0 | 0 | 0 | 0 | 0 | 0 | 0 | 0 | 0 | 0 | 0 | 1 |
| 1 | 0 | 0 | 0 | 0 | 0 | 0 | 0 | 0 | 0 | 0 | 0 | 0 | 0 | 0 | 0 |

FIG. 13

| DS0 | DS1 | DS2 | DS3 | DS4 | DS5 | DS6 | DS7 |
|---|---|---|---|---|---|---|---|
| I | I | I | I | I | I | I | I |
| $T^{8767}$ | $T^{3899}$ | $T^{41570}$ | $T^{51888}$ | $T^{6042}$ | $T^{27545}$ | $T^{11996}$ | $T^{65113}$ |

| DS8 | DS9 | DS10 | DS11 | DS12 | DS13 | DS14 | DS15 |
|---|---|---|---|---|---|---|---|
| I | I | I | I | I | I | I | I |
| $T^{17089}$ | $T^{28454}$ | $T^{63232}$ | $T^{27210}$ | $T^{29774}$ | $T^{25919}$ | $T^{80211}$ | $T^{16685}$ |

| DS16 | DS17 | DS18 | DS19 | DS20 | DS21 | DS22 | DS23 |
|---|---|---|---|---|---|---|---|
| I | I | I | I | I | I | I | I |
| $T^{44963}$ | $T^{29723}$ | $T^{55142}$ | $T^{37262}$ | $T^{15858}$ | $T^{4570}$ | $T^{56786}$ | $T^{8118}$ |

| DS24 | DS25 | DS26 | DS27 | DS28 | DS29 | DS30 | DS31 | ES0 | ES1 |
|---|---|---|---|---|---|---|---|---|---|
| I | I | I | I | I | I | I | I | I | I |
| $T^{35577}$ | $T^{2629}$ | $T^{37969}$ | $T^{42848}$ | $T^{11620}$ | $T^{32767}$ | $T^{401}$ | $T^{43923}$ | 0 | I |

FIG. 14

| DS0 | DS1 | DS2 | DS3 | DS4 | DS5 | DS6 | DS7 |
|---|---|---|---|---|---|---|---|
| I | I | I | I | I | I | I | I |
| $T^{9795}$ | $T^{16884}$ | $T^{55086}$ | $T^{16672}$ | $T^{53354}$ | $T^{15967}$ | $T^{60886}$ | $T^{22942}$ |

| DS8 | DS9 | DS10 | DS11 | DS12 | DS13 | DS14 | DS15 | DS16 | ES0 | ES1 |
|---|---|---|---|---|---|---|---|---|---|---|
| I | I | I | I | I | I | I | I | I | I | I |
| $T^{12893}$ | $T^{16463}$ | $T^{40370}$ | $T^{31020}$ | $T^{23053}$ | $T^{54438}$ | $T^{38353}$ | $T^{36025}$ | $T^{60096}$ | 0 | 1 |

MEMORY SYSTEM INCLUDING ECC ENGINE

CROSS-REFERENCE TO RELATED APPLICATION

This application claims priority under 35 U.S.C. § 119 (a) to Korean Patent Application No. 10-2024-0031974 filed on Mar. 6, 2024, which is incorporated herein by reference in its entirety.

BACKGROUND

1. Technical Field

Embodiments of the present disclosure relate to a memory.

2. Related Art

In the early days of the semiconductor memory industry, a plurality of original good dies having no defective memory cells in a memory chip having passed through a semiconductor manufacturing process have been distributed on a wafer. However, as the capacity of a memory gradually increases, it has become difficult to produce a memory having no defective memory cells. At the present time, there is no probability that such a memory will be manufactured. One way to overcome such a situation is a method of repairing defective memory cells of a memory with redundancy memory cells.

As another way, an error correction circuit (i.e., ECC engine) that corrects an error in the memory system is used. The error correction circuit may correct an error occurring in a memory cell and an error occurring when data is transmitted during a read/write process of the memory system.

SUMMARY

In an embodiment of the present disclosure, a memory system may include a memory core; and an ECC engine configured to, during a write operation perform a logical operation on an M-bit write data to be stored in the memory core and an H matrix, and generate an N-bit first error correction code and an N-bit second error correction code to be stored in the memory core together with the write data, where N is an integer of 2 or more and M is a multiple of N, The H matrix may include an upper matrix having a size of N*(M+2N) and a lower matrix having a size of N*(M+2N), the lower matrix may include M/N $T^k$ companion matrices each having a size of N*N, and k of the $T^k$ companion matrices may have values which are positive integers different by N or more for each companion matrix.

In an embodiment of the present disclosure, a memory system may include a memory core; and an ECC engine configured to, during a write operation, perform a logical operation on an M-bit write data to be stored in the memory core and an H matrix during a write operation, and generate a 16-bit first error correction code and a 16-bit second error correction code, where M is an integer that is a multiple of 16, The H matrix may include an upper matrix having a size of 16*(M+32) and a lower matrix having a size of 16*(M+32), the lower matrix may include a zero matrix having a size of 16*16, an identity matrix having a size of 16*16, and M/16 $T^k$ companion matrices each having a size of 16*16, and k of the $T^k$ companion matrices may have values which are positive integers different from each other by 16 or more for each companion matrix.

BRIEF DESCRIPTION OF THE DRAWINGS

FIG. 2 is a diagram illustrating an example of an H matrix used by an ECC engine.

FIG. 3 is a diagram for describing a process in which the ECC engine generates an error correction code (ECC) by using the H matrix in FIG. 2.

FIG. 4 is a diagram for describing how the error correction codes are generated when data all have a value of 1.

FIG. 5 is a diagram for describing a process in which the ECC engine generates syndromes by using the H matrix in FIG. 2 during a read operation, that is, a decoding operation of correcting an error.

FIG. 6 is a diagram for describing how the syndromes are generated by the ECC engine when a 1-bit error exists in data read from a memory core and the error is corrected.

FIG. 7 is a diagram for describing how the syndromes are generated by the ECC engine when a 2-bit error exists in the data read from the memory core and the error is corrected.

FIGS. 8 and 9 are diagrams for describing how the syndromes are generated by the ECC engine when an error exists in different symbols in the data read from the memory core and the error is corrected.

FIG. 11 is a diagram illustrating companion matrices.

FIGS. 12A to 12G are examples of companion matrices each having a size of 16*16 generated using elements of GF ($\alpha^{16}$) generated with a primitive polynomial $p(x)=x^{16}+x^{12}+x^3+x^1+1$ and $\alpha=2$.

FIG. 13 is an H matrix constructed according to rules (a) and (b) in accordance with an embodiment of the present disclosure.

FIG. 14 is another H matrix constructed according to rules (a) and (b) in accordance with an embodiment of the present disclosure.

DETAILED DESCRIPTION

Various embodiments of the present disclosure are directed to providing a technology for preventing miscorrection occurring in a process of correcting an error of a memory.

In accordance with embodiments of the present disclosure, miscorrection occurring in a process of correcting an error of a memory may be prevented.

Hereafter, embodiments in accordance with the technical spirit of the present disclosure will be described with reference to the accompanying drawings.

Figure 1:
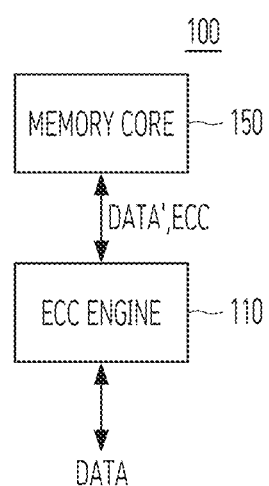
FIG. 1 is a diagram illustrating a configuration of a memory system in accordance with an embodiment of the present disclosure.

FIG. 1 is a diagram illustrating a configuration of a memory system 100 in accordance with an embodiment of the present disclosure. FIG. 1 illustrates only parts of the memory system 100 directly related to data storage and data error correction.

Referring to FIG. 1, the memory system 100 may include an ECC engine 110 and a memory core 150.

The ECC engine 110 may generate an error correction code ECC by using data DATA during a write operation of the memory system 100, that is, during an encoding operation from the perspective of the ECC engine 110. Because the error correction code ECC is merely generated and no error correction operation is performed during the write operation, data DATA input to the ECC engine 110 and the data DATA' output from the ECC engine 110 may be the same during the write operation.

During a read operation of the memory system 100, that is, during a decoding operation from the perspective of the ECC engine 110, the ECC engine 110 may correct an error in the data DATA' by using data DATA' read from the memory core 150 and an error correction code ECC read from the memory core 150. Correcting an error may refer to detecting an error in the data DATA' and correcting the error when the error is detected.

During the write operation, the memory core 150 may receive and store the data DATA' and the error correction code ECC generated by the ECC engine 110. During the read operation, the memory core 150 may transmit the stored data DATA' and the error correction code ECC to the ECC engine 110.

The memory core 150 may refer to a region where data is stored within the memory system 100. In the memory system 100, data may be stored in one memory, but the data may also be distributed and stored in a plurality of memories. Accordingly, the memory core 150 may refer to a region where data is stored within one memory, or may refer to a region where data is stored inside a plurality of memories. That is, the memory core 150 in FIG. 1 may exist within one memory, or may be distributed within several memories.

The ECC engine 110 may be provided anywhere on a path through which data is transmitted during write and read operations in the memory system 100. During the write operation, write data may be transmitted from a memory controller to the memory core 150, and during the read operation, read data may be transmitted from the memory core 150 to the memory controller. The ECC engine 110 may be located anywhere on a path through which the write data and the read data are transmitted. For example, the ECC engine 110 may be provided inside the memory controller or within the memory. Alternatively, the ECC engine 110 may be provided inside a buffer chip that buffers data between the memory controller and the memory.

The ECC engine 110 may have the ability to correct symbol-level errors occurring in the data DATA' read from the memory core 150. A Reed-Solomon (RS) method may be used for the symbol-level error correction. The ECC engine 110 may generate the error correction code ECC by using an H matrix called a check matrix, and correct an error by using the error correction code ECC. This is described below.

Figure 2:
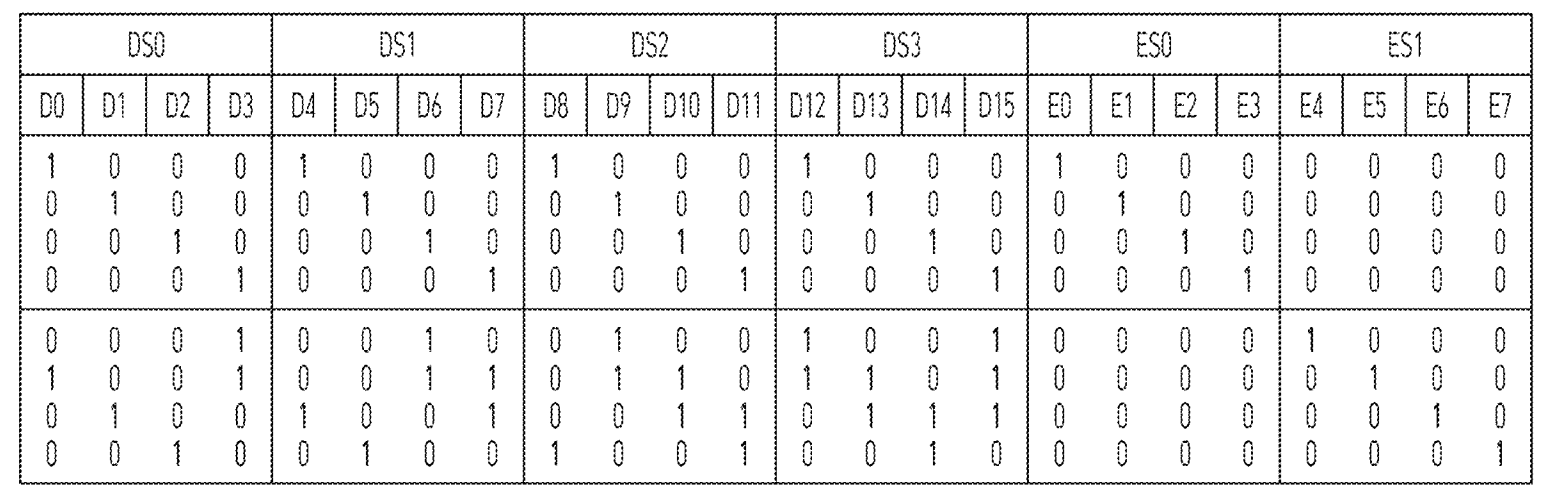

FIG. 2 is a diagram illustrating an example of the H matrix used by the ECC engine 110. For convenience, the illustrated data DATA is 16 bits (i.e., D0 to D15), an error correction code ECC is 8 bits (i.e., E0 to E7), and a symbol size is 4 bits. However, other values may be used.

The H matrix may include a matrix of (number of bits of error correction code)*(number of bits of data+number of bits of error correction code). Because the error correction code ECC is 8 bits and the data is 16 bits, the H matrix may include an 8*24 matrix. Each component of the H matrix may have a value of 1 or 0.

Column vectors of the H matrix may correspond to the bits D0 to D15 of the data DATA and the bits E0 to E7 of the error correction code ECC. For example, among the 24 column vectors, 16 column vectors may correspond to the bits D0 to D15 of the data DATA and 4 column vectors may correspond to the bits E0 to E7 of the error correction code ECC. In FIG. 2, it may be seen that D1 corresponds to a column vector with a value of '01000010' and E2 corresponds to a column vector with a value of '00100000'.

Because the symbol size is 4 bits, the data D0 to D15 may be divided into 4 symbols DS0 to DS3, and the error correction codes E0 to E7 may be divided into 2 symbols ES0 and ES1. The H matrix may include square matrices of (symbol size)*(symbol size). Referring to the H matrix in FIG. 2, it may be seen that an upper matrix includes 4*4 identity matrices corresponding to the data symbols DS0 to DS3 and the error correction code symbol ES0 and a 4*4 zero matrix corresponding to the error correction code symbol ES1. It may be seen that a lower matrix includes 4*4 square matrices corresponding to the data symbols DS0 to DS3, a 4*4 zero matrix corresponding to the error correction code symbol ES0, and a 4*4 identity matrix corresponding to the error correction code symbol ES1.

FIG. 3 is a diagram for describing a process in which the ECC engine 110 generates an error correction code ECC by using the H matrix in FIG. 2.

The ECC engine 110 may multiply each of the column vectors of the H matrix with corresponding bits and then generate the error correction code so that the sum of rows is 0 (that is, an even number).

That is, the error correction codes E0 to E7 may be generated so that the following eight equations are all satisfied.

$$1*D0+0*D1+0*D2+0*D3+1*D4+0*D5+0*D6+ \\ 0*D7+1*D8+0*D9+0*D10+0*D11+1*D12+ \\ 0*D13+0*D14+0*D15+1*E0+0*E1+0*E2+ \\ 0*E3+0*E4+0*E5+0*E6+0*E7=0 \quad \text{Equation 1}$$

$$0*D0+1*D1+0*D2+0*D3+0*D4+1*D5+0*D6+ \\ 0*D7+0*D8+1*D9+0*D10+0*D11+0*D12+ \\ 1*D13+0*D14+0*D15+0*E0+1*E1+0*E2+ \\ 0*E3+0*E4+0*E5+0*E6+0*E7=0 \quad \text{Equation 2}$$

$$0*D0+1*D1+0*D2+0*D3+0*D4+1*D5+0*D6+ \\ 0*D7+0*D8+1*D9+0*D10+0*D11+0*D12+ \\ 1*D13+0*D14+0*D15+0*E0+1*E1+0*E2+ \\ 0*E3+0*E4+0*E5+0*E6+0*E7=0 \quad \text{Equation 3}$$

$$0*D0+0*D1+0*D2+1*D3+0*D4+0*D5+0*D6+ \\ 1*D7+0*D8+0*D9+0*D10+1*D11+0*D12+ \\ 0*D13+0*D14+1*D15+0*E0+0*E1+0*E2+ \\ 1*E3+0*E4+0*E5+0*E6+0*E7=0 \quad \text{Equation 4}$$

$$0*D0+0*D1+0*D2+1*D3+0*D4+0*D5+1*D6+ \\ 0*D7+0*D8+1*D9+0*D10+0*D11+1*D12+ \\ 0*D13+0*D14+1*D15+0*E0+0*E1+0*E2+ \\ 0*E3+1*E4+0*E5+0*E6+0*E7=0 \quad \text{Equation 5}$$

$$1*D0+0*D1+0*D2+1*D3+0*D4+0*D5+1*D6+ \\ 1*D7+0*D8+1*D9+1*D10+0*D11+1*D12+ \\ 1*D13+0*D14+1*D15+0*E0+0*E1+0*E2+ \\ 0*E3+0*E4+1*E5+0*E6+0*E7=0 \quad \text{Equation 6}$$

$$0*D0+1*D1+0*D2+0*D3+1*D4+0*D5+0*D6+ \\ 1*D7+0*D8+0*D9+1*D10+1*D11+0*D12+ \\ 1*D13+1*D14+1*D15+0*E0+0*E1+0*E2+ \\ 0*E3+0*E4+0*E5+1*E6+0*E7=0 \quad \text{Equation 7}$$

$$0*D0+0*D1+1*D2+0*D3+0*D4+1*D5+0*D6+ \\ 0*D7+1*D8+0*D9+0*D10+1*D11+0*D12+ \\ 0*D13+1*D14+0*D15+0*E0+0*E1+0*E2+ \\ 0*E3+0*E4+0*E5+0*E6+1*E7=0 \quad \text{Equation 8}$$

The addition in the above equations and the following description means an exclusive OR. Accordingly, the result of the addition may be performed in such a way that when the number of 1's is even, the result of the addition is 0, and when the number of 1's is odd, the result of the addition is 1. For example, 1+1+0+1 may be 1 and 0+1+1+0 may be 0.

Figure 4:
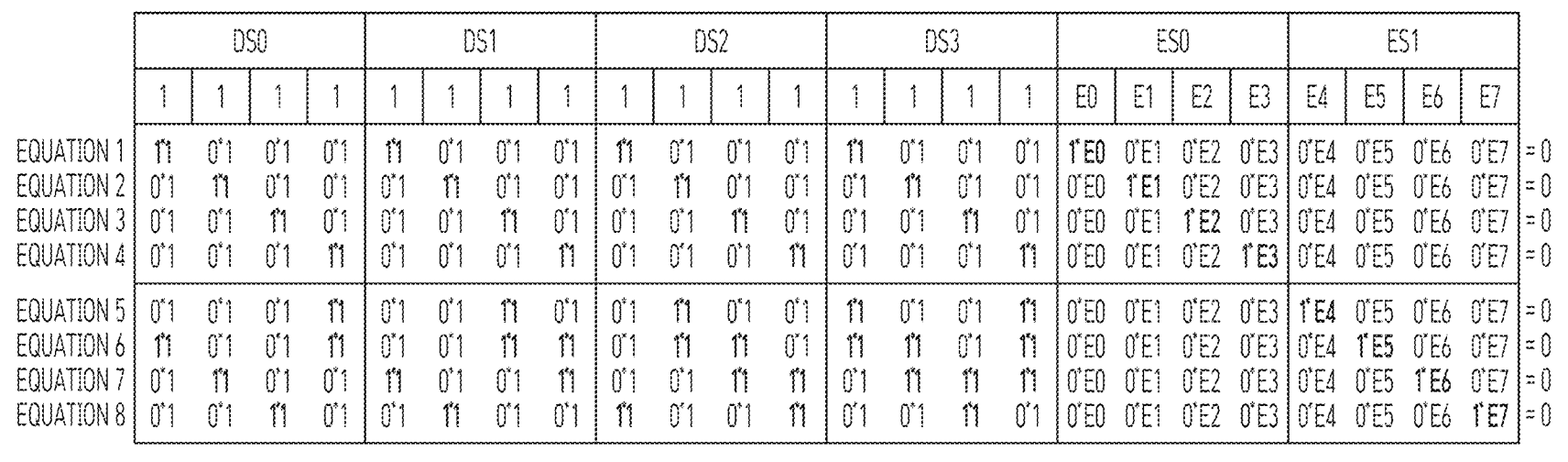

FIG. 4 is a diagram for describing how the error correction codes E0 to E7 are generated when the data D0 to D15 all have a value of 1.

Referring to FIG. 4, the values of the error correction codes E0 to E7 may be obtained by putting 1 into the data D0 to D15 of Equation 1 to Equation 8 above and solving the equations.

In this case, the error correction codes E0 to E7 may be generated as (0, 0, 0, 0, 1, 1, 0, 1).

FIG. 5 is a diagram for describing a process in which the ECC engine 110 generates the syndromes S0 to S7 by using the H matrix in FIG. 2 during a read operation, that is, during a decoding operation of correcting an error.

The ECC engine 110 may generate the syndromes S0 to S7 by performing a logical operation on the data DATA' (=D0' to D15') read from the memory core 150/the error correction code ECC(=E0 to E7) and the H matrix. The ECC engine 110 may generate the syndromes S0 to S7 by multiplying each of the column vectors of the H matrix with corresponding bits and then calculating the sum of rows.

That is, the syndromes S0 to S7 may be generated using the following eight equations. The syndromes S0 to S7 may be used to detect and correct an error.

$$1*D0'+0*D1'+0*D2'+0*D3'+1*D4'+0*D5'+0*D6'+\\0*D7'+1*D8'+0*D9'+0*D10'+0*D11'+1*D12'+\\0*D13'+0*D14'+0*D15'+1*E0+0*E1+0*E2+\\0*E3+0*E4+0*E5+0*E6+0*E7=S0 \quad \text{Equation 9}$$

$$0*D0'+1*D1'+0*D2'+0*D3'+0*D4'+1*D5'+0*D6'+\\0*D7'+0*D8'+1*D9'+0*D10'+0*D11'+0*D12'+\\1*D13'+0*D14'+0*D15'+0*E0+1*E1+0*E2+\\0*E3+0*E4+0*E5+0*E6+0*E7=S1 \quad \text{Equation 10}$$

$$0*D0'+1*D1'+0*D2'+0*D3'+0*D4'+1*D5'+0*D6'+\\0*D7'+0*D8'+1*D9'+0*D10'+0*D11'+0*D12'+\\1*D13'+0*D14'+0*D15'+0*E0+1*E1+0*E2+\\0*E3+0*E4+0*E5+0*E6+0*E7=S2 \quad \text{Equation 11}$$

$$0*D0'+0*D1'+0*D2'+1*D3'+0*D4'+0*D5'+0*D6'+\\1*D7'+0*D8'+0*D9'+0*D10'+1*D11'+0*D12'+\\0*D13'+0*D14'+1*D15'+0*E0+0*E1+0*E2+\\1*E3+0*E4+0*E5+0*E6+0*E7=S3 \quad \text{Equation 12}$$

$$0*D0'+0*D1'+0*D2'+1*D3'+0*D4'+0*D5'+1*D6'+\\0*D7'+0*D8'+1*D9'+0*D10'+0*D11'+1*D12'+\\0*D13'+0*D14'+1*D15'+0*E0+0*E1+0*E2+\\0*E3+1*E4+0*E5+0*E6+0*E7=S4 \quad \text{Equation 13}$$

$$1*D0'+0*D1'+0*D2'+1*D3'+0*D4'+0*D5'+1*D6'+\\1*D7'+0*D8'+1*D9'+1*D10'+0*D11'+1*D12'+\\1*D13'+0*D14'+1*D15'+0*E0+0*E1+0*E2+\\0*E3+0*E4+1*E5+0*E6+0*E7=S5 \quad \text{Equation 14}$$

$$0*D0'+1*D1'+0*D2'+0*D3'+1*D4'+0*D5'+0*D6'+\\1*D7'+0*D8'+0*D9'+1*D10'+1*D11'+0*D12'+\\1*D13'+1*D14'+1*D15'+0*E0+0*E1+0*E2+\\0*E3+0*E4+0*E5+1*E6+0*E7=S6 \quad \text{Equation 15}$$

$$0*D0'+0*D1'+1*D2'+0*D3'+0*D4'+1*D5'+0*D6'+\\0*D7'+1*D8'+0*D9'+0*D10'+1*D11'+0*D12'+\\0*D13'+1*D14'+0*D15'+0*E0+0*E1+0*E2+\\0*E3+0*E4+0*E5+0*E6+1*E7=S7 \quad \text{Equation 16}$$

When there is no error in the data DATA' (=D0' to D15') read from the memory core 150 and the error correction code ECC(=E0 to E7), the syndromes S0 to S7 generated by the ECC engine 110 may all have a value of 0.

Figure 6:
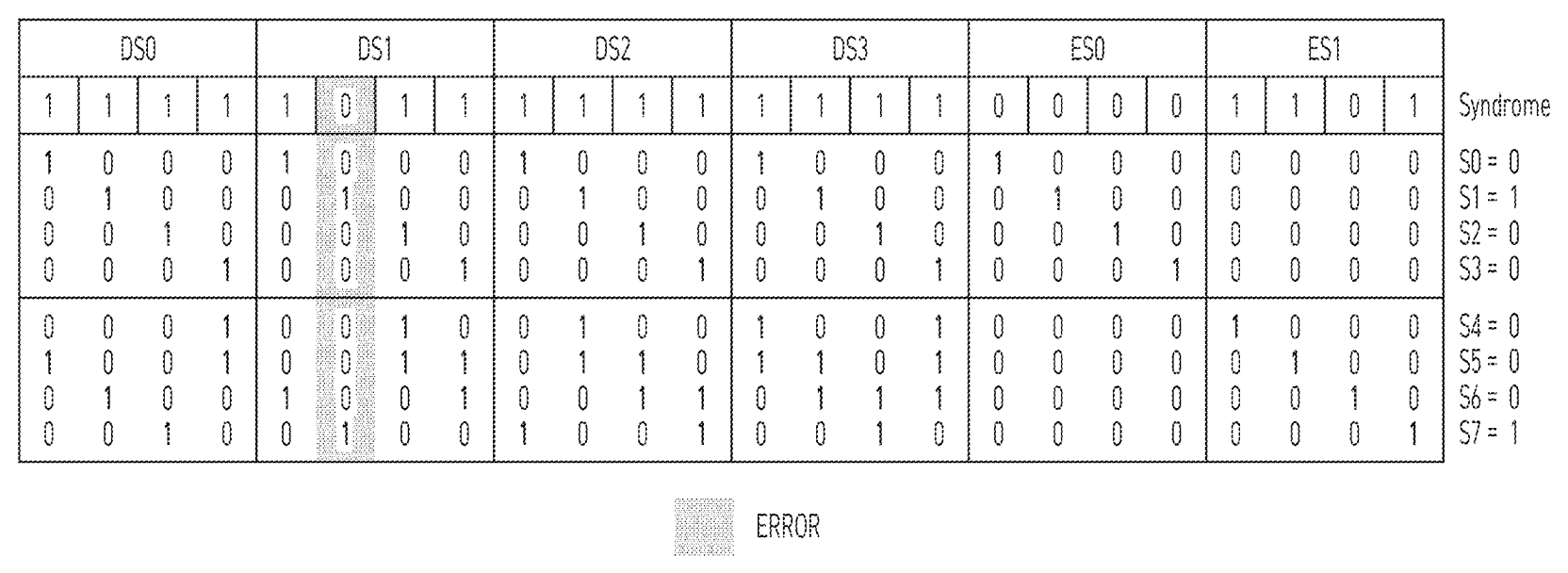

FIG. 6 is a diagram for describing how the syndromes S0 to S7 are generated by the ECC engine 110 when a 1-bit error exists in the data DATA' (=D0' to D15') read from the memory core 150 and the error is corrected. In FIG. 6, the illustrated data D0 to D15 all have a value of 1 as in the example of FIG. 4 and the error correction codes E0 to E7 of (0, 0, 0, 0, 1, 1, 0, 1) generated using the data D0 to D15 are written to the memory core 150, and then the data DATA' (=D0' to D15') and the error correction code ECC(=E0 to E7) are read.

Referring to FIG. 6, it may be seen that an error exists in which 1 bit D5' among the data D0' to D15' read from the memory core 150 is changed from 1 to 0. When the data D0' to D15' and the error correction codes E0 to E7 are put into Equation 9 to Equation 16 above for calculation, the syndromes S0 to S7 may be generated as (0, 1, 0, 0, 0, 0, 0, 1).

In the syndromes S0 to S7, a first part S0 to S3 may indicate the location of an error in a symbol, and a second part S4 to S7 may be used to find a symbol with an error. In the first part S0 to S3, a part with a value of 1 may correspond to a part with an error. Because the value of the first part S0 to S3 is (0, 1, 0, 0), this may mean that an error exists in a second bit of the symbol with an error. The value (0, 0, 0, 1) of the second part may indicate that an error exists in the symbol DS1 whose bottom of a column vector of the second bit in the symbol is (0, 0, 0, 1). That is, the syndromes S0 to S7 may indicate that an error exists in the second bit D5' of the symbol DS1, and the ECC engine 110 may correct the error by inverting the second bit D5' of the symbol DS1.

FIG. 7 is a diagram for describing how the syndromes S0 to S7 are generated by the ECC engine 110 when a 2-bit error exists in the data DATA' (=D0' to D15') read from the memory core 150 and the error is corrected. In FIG. 7, the illustrated data D0 to D15 all have a value of 1 as in the example of FIG. 4 and the error correction codes E0 to E7 of (0, 0, 0, 0, 1, 1, 0, 1) generated using the data D0 to D15 are written to the memory core 150, and then the data DATA' (=D0' to D15') and the error correction code ECC(=E0 to E7) are read.

Referring to FIG. 7, it may be seen that an error exists in which 2 bits D9' and D10' among the data D0' to D15' read from the memory core 150 are changed from 1 to 0. In this case, the syndromes S0 to S7 may be generated as (0, 1, 1, 0, 1, 0, 1, 0).

Because the first part S0 to S3 in the syndromes S0 to S7 is (0, 1, 1, 0), this may mean that an error exists in second and third bits in a symbol with an error. The second part S4 to S7 of the syndromes S0 to S7 has a value of (1, 0, 1, 0), which may be used to find which of the symbols has an error. The method is to find a symbol that produces (1, 0, 1, 0) when lower column vectors of the second and third bits are added. Because (1, 0, 1, 0) is obtained when the lower column vector (1, 1, 0, 0) of the second bit and the lower column vector (0, 1, 1, 0) of the third bit in the symbol DS2 are added, it may be seen that the symbol DS2 is a symbol with an error. That is, it may be seen that an error exists in the second and third bits D9' and D10' of the symbol DS2 by using the values of the syndromes S0 to S7, and the ECC engine 110 may correct the error by inverting these bits D9' and D10'.

Figure 8:
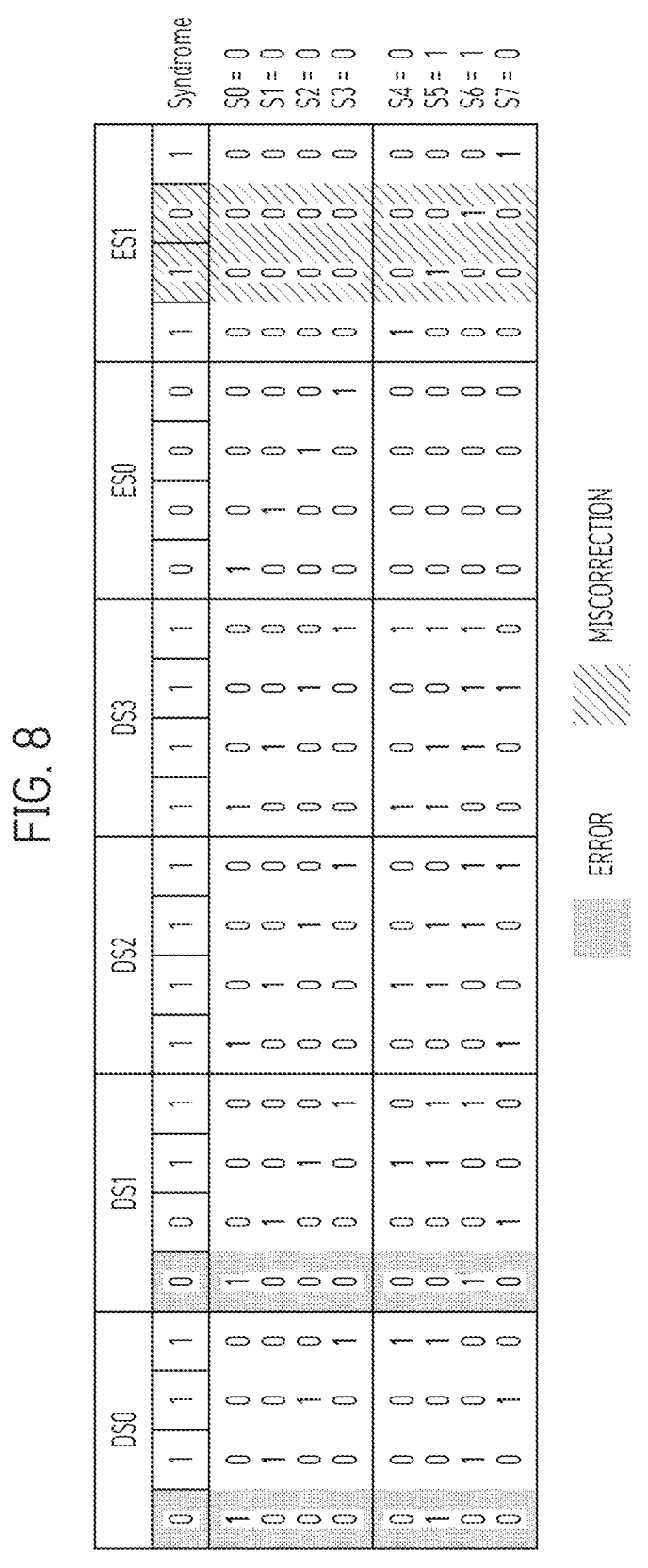
Figure 9:
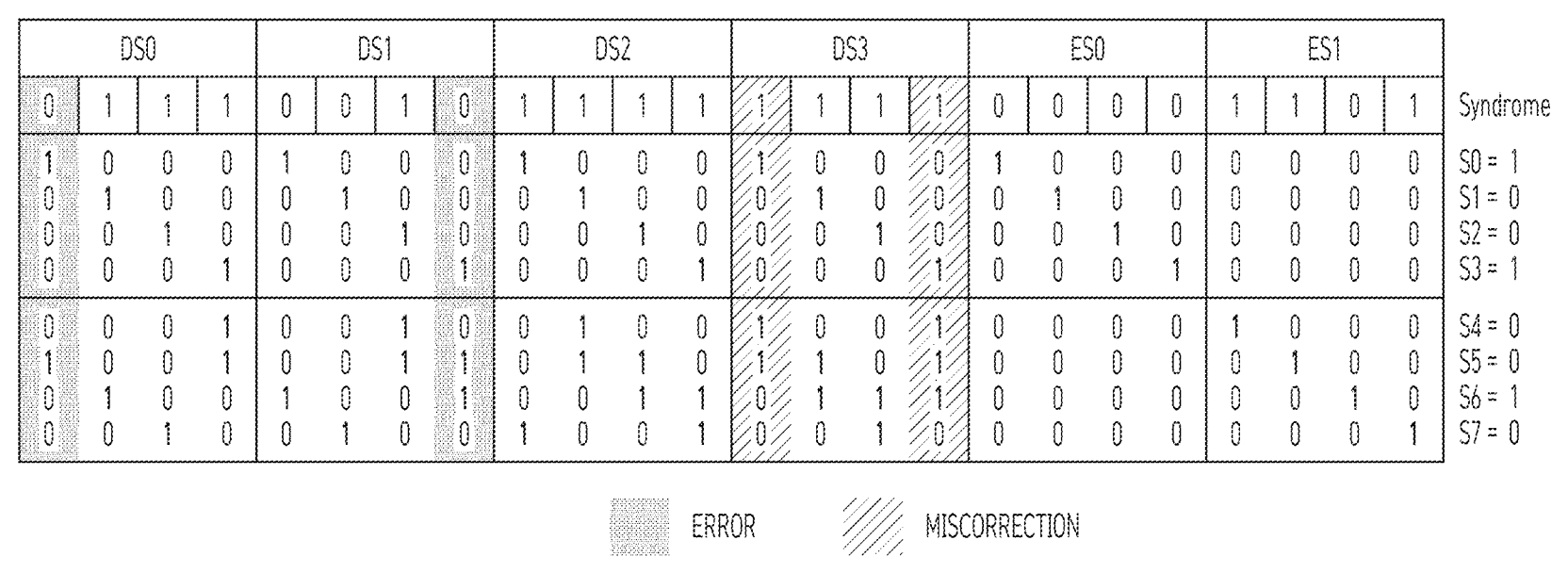

FIGS. 8 and 9 are diagrams for describing how the syndromes S0 to S7 are generated by the ECC engine 110 when an error exists in different symbols in the data DATA' (=D0' to D15') read from the memory core 150 and the error is corrected. In FIGS. 8 and 9, the illustrated data D0 to D15 all have a value of 1 as in the example of FIG. 4 and the error correction codes E0 to E7 of (0, 0, 0, 0, 1, 1, 0, 1) generated using the data D0 to D15 are written to the memory core 150, and then the data DATA' (=D0' to D15') and the error correction code ECC(=E0 to E7) are read.

Referring to FIG. 8, it may be seen that an error exists in which the first bit D0' of the symbol DS0 and the first bit D4' of the symbol DS1 among the data D0' to D15' read from the memory core 150 are changed from 1 to 0. When the data D0' to D15' and the error correction codes E0 to E7 are put into Equation 9 to Equation 16 above for calculation, the syndromes S0 to S7 may be generated as (0, 0, 0, 0, 0, 1, 1, 0).

In the syndromes S0 to S7, the first part S0 to S3 indicates the location of an error in a symbol. Because this part is (0, 0, 0, 0), no error exists in the symbol. However, because the second part S4 to S7 of the syndromes S0 to S7 is not (0, 0, 0, 0), an error may exist. If an error exists, then an error exists in the symbol ES1 corresponding to the zero matrix. The second part S4 to S7 is (0, 1, 1, 0), which is the result when an error exists in a second bit E5 and a third bit E6 of the symbol ES1. Accordingly, the ECC engine 110 may determine that an error exists in the second bit E5 and the third bit E6 of the symbol ES1 and correct the error by inverting these bits E5 and E6. Actually, a part where the error has occurred is the data bits D0' and D4', but the error in the bits D0' and D4' remains and the bits E5 and E6 with no error of the error correction code are corrected, causing miscorrection in which an error increases. That is, when an error occurs in different symbols, the ECC engine 110 might not reduce the error but rather, an error may increase.

Referring to FIG. 9, it may be seen that an error exists in which the first bit D0' of the symbol DS0 and the fourth bit D7' of the symbol DS1 among the data D0' to D15' read from the memory core 150 are changed from 1 to 0. When the data D0' to D15' and the error correction codes E0 to E7 are put into Equation 9 to Equation 16 above for calculation, the syndromes S0 to S7 may be generated as (1, 0, 0, 1, 0, 0, 1, 0).

In the syndromes S0 to S7, the first part S0 to S3 indicates the location of an error in a symbol. Because this part is (1, 0, 0, 1), it may mean that an error exists in the first bit and the fourth bit in the symbol with an error. The second part of the syndromes S0 to S7 has a value of (0, 0, 1, 0), and a symbol that produces (0, 0, 1, 0) when lower column vectors of the first bit and the fourth bit are added (XORed) needs to be found. The symbol DS3 corresponds to this case. Accordingly, the ECC engine 110 may determine that an error exists in the first bit D12' and the fourth bit D15' of the symbol DS3 and correct the error by inverting these bits D12' and D15'. Actually, a part where the error has occurred is the data bits D0' and D7', but the error in the bits D0' and D7' remains and the bits D12' and D15' with no error are corrected, causing miscorrection in which an error increases.

The miscorrection illustrated in FIGS. 8 and 9 occurs because it is not possible to distinguish errors only by the values of the syndromes S0 to S7. For example, as illustrated in FIG. 8, when an error occurs in the bits D0' and D4' and when an error occurs in the bits E5 and E6, because the values of the syndromes S0 to S7 are generated the same, even though an error occurs in the bits D0' and D4', the ECC engine 110 may determine that an error has occurred in the bits E5 and E6 and make a miscorrection. In addition, as illustrated in FIG. 9, when an error occurs in the bits D0' and D7' and when an error occurs in the bits D12' and D15', because the values of the syndromes S0 to S7 are generated the same, even though an error occurs in the bits D0' and D7', the ECC engine 110 may determine that an error has occurred in the bits D12' and D15' and make a miscorrection. The configuration of the H matrix for preventing such a miscorrection will be described below.

Before the configuration of the H matrix for preventing the miscorrection is described, a Galois field, a primitive element, a primitive polynomial, and a companion matrix will be described.

The Galois field: A Galois field (GF) refers to a field with a finite number of elements, and a Galois field with a size X has a finite number of X elements from 0 to (X−1). For example, a Galois field with a finite number of 16 ($=2^4$) elements from 0 to 15 may exist, and may be expressed as GF(16) or GF($2^4$).

The primitive element: All elements except 0 in the Galois field (GF) may be expressed as the square of some element $\alpha$, and this element is called a primitive element. When a certain Galois field is expressed as GF($2^n$), 2 may be used as a primitive element. For example, elements of GF($2^3$) are as follows: GF($2^3$)={0, $\alpha^1$, $\alpha^2$, $\alpha^3$, $\alpha^4$, $\alpha^5$, $\alpha^6$, $\alpha^7$ ($=1=\alpha^0$)}. The last element $\alpha^7$ of the Galois field is also expressed as 1 or $\alpha^0$.

The primitive polynomial: When a Galois field is generated, a primitive polynomial is used, which determines which of the square forms of a each element in the Galois field corresponds to. Even with Galois fields with the same size, a corresponding form may vary depending on a primitive polynomial that is selected.

Figure 10:
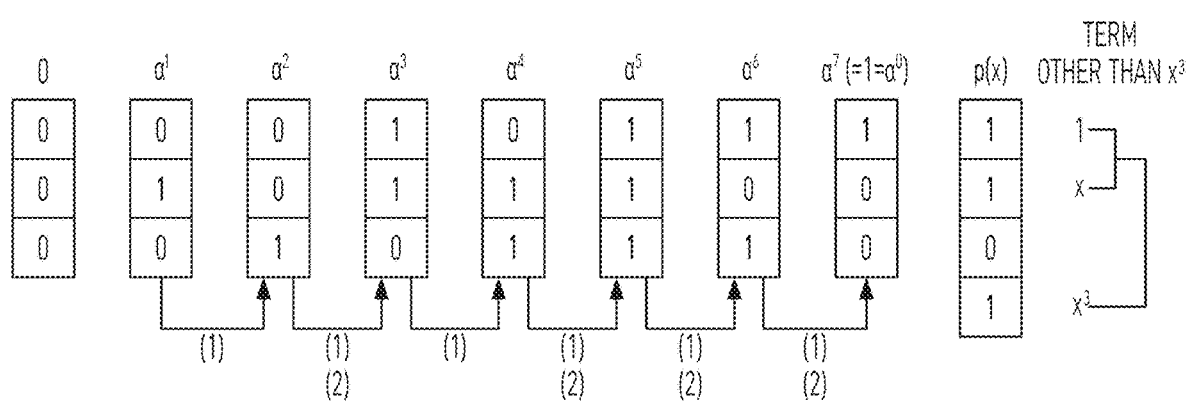
FIG. 10 is a diagram for describing a process of generating elements of GF ($2^3$) by using a primitive polynomial $p(x)=x^3+x+1$ and $\alpha=2$.

When GF($2^3$) is generated using a primitive polynomial $p(x)=x^3+x+1$ and $\alpha=2$, a result illustrated in FIG. 10 may be obtained. The following rules such as (1) and (2) may be used to determine $\alpha^i$.

(1) Because $\alpha^i$ is a value obtained by multiplying $\alpha^{i-1}$ by $\alpha$ ($=2$), $\alpha^i$ is shifted by 1 bit.

(2) When 1 is generated at a $x^3$ position of p(x) due to the shift, an XOR operation is performed on the result of (1) and a term other than $x^3$ in order to replace 1 with the term other than $x^3$.

Referring to FIG. 10, $\alpha^2$ may be generated from $\alpha^1$ by applying the rule (1). That is, $\alpha^2$ may be (0, 0, 1) by shifting 1 bit from (0, 1, 0) of $\alpha^1$.

$\alpha^3$ may be generated from $\alpha^2$ by applying the rules (1) and (2). First, the rule of (1) may be applied so that (0, 0, 1) is changed to (0, 0, 0), and then the rule of (2) may be applied, that is, an XOR operation is performed on (0, 0, 0) and (1, 1, 0) to obtain (1, 1, 0). $\alpha^4$ may be generated from $\alpha^3$ by applying the rule (1), that is, may be (0, 1, 1) by being shifted from (1, 1, 0).

$\alpha^5$ may be generated as (0, 0, 1) from $\alpha^4$ by applying the rule (1), and then the rule of (2) may be applied, that is, an XOR operation is performed on (0, 0, 1) and (1, 1, 0) to obtain (1, 1, 1).

$\alpha^6$ and $\alpha^7$ may also be generated by applying the same rules.

The companion matrix: The companion matrix may refer to a matrix including column vectors of $\alpha^1$. For example, a companion matrix $T^j$ having a size of y*y may be a matrix including column vectors of $\alpha^j$, $\alpha^{j+1}$, $\alpha^{j+2}$, ..., $\alpha^{j+y-1}$. Likewise, a companion matrix $T^1$ may be a matrix including column vectors of $\alpha^1$, $\alpha^2$, $\alpha^3$, ..., $\alpha^y$. FIG. 11 illustrates $T^1$ and $T^j$.

FIGS. 12A to 12G are examples of companion matrices each having a size of 16*16 generated using elements of GF($\alpha^{16}$) generated with a primitive polynomial p(x)=$x^{16}$+$x^{12}$+$x^3$+$x^1$+1 and $\alpha=2$.

FIG. 12A illustrates the companion matrix $T^1$. The companion matrix $T^1$ may include column vectors of $\alpha^1$, $\alpha^2$, $\alpha^3$, ..., $\alpha^{16}$. Referring to FIG. 12A, $\alpha^1$ may have a value of (0, 1, 0, 0, 0, 0, 0, 0, 0, 0, 0, 0, 0, 0, 0, 0), and $\alpha^2$ may have a value of (0, 0, 1, 0, 0, 0, 0, 0, 0, 0, 0, 0, 0, 0, 0, 0) shifted from $\alpha^1$ by 1 bit. $\alpha^3$ may have a value of (0, 0, 0, 1, 0, 0, 0, 0, 0, 0, 0, 0, 0, 0, 0, 0) shifted from $\alpha^2$ by 1 bit. $\alpha^{15}$ may have a value of (0, 0, 0, 0, 0, 0, 0, 0, 0, 0, 0, 0, 0, 0, 0, 1), and $\alpha^{16}$ may have a value of (1, 1, 0, 1, 0, 0, 0, 0, 0, 0, 0, 0, 1, 0, 0, 0) generated by shifting from $\alpha^{15}$ by 1 bit and by using the primitive polynomial $p(x)=x^{16}+x^{12}+x^3+x^1+1$.

FIG. 12B illustrates a companion matrix $T^2$. $\alpha^2$ to $\alpha^{16}$ of $T^2$ may have the same values as $\alpha^2$ to $\alpha^{16}$ of $T^1$, and $\alpha^{17}$ may have a value of (0, 1, 1, 0, 1, 0, 0, 0, 0, 0, 0, 0, 0, 1, 0, 0) shifted from $\alpha^{16}$.

FIG. 12C illustrates a companion matrix $T^3$. $\alpha^3$ to $\alpha^{17}$ of $T^3$ may have the same values as $\alpha^3$ to $\alpha^{17}$ of $T^2$, and $\alpha^{18}$ may have a value of (0, 0, 1, 1, 0, 1, 0, 0, 0, 0, 0, 0, 0, 0, 1, 0) shifted from $\alpha^{17}$.

FIG. 12D illustrates a companion matrix $T^4$. $\alpha^4$ to $\alpha^{18}$ of $T^4$ may have the same values as $\alpha^4$ to $\alpha^{18}$ of $T^3$, and $\alpha^{19}$ may have a value of (0, 0, 0, 1, 1, 0, 1, 0, 0, 0, 0, 0, 0, 0, 0, 1) shifted from $\alpha^{18}$.

FIG. 12E illustrates a companion matrix $T^5$. $\alpha^5$ to $\alpha^{19}$ of $T^5$ may have the same values as $\alpha^5$ to $\alpha^{19}$ of $T^4$, and $\alpha^{20}$ may have a value of (1, 1, 0, 1, 1, 1, 0, 1, 0, 0, 0, 1, 0, 0, 0) generated by shifting from $\alpha^{19}$ by 1 bit and by using the primitive polynomial $p(x)=x^{16}+x^{12}+x^3+x^1+1$.

FIG. 12F illustrates a companion matrix $T^{500}$. $T^{500}$ may include column vectors from $\alpha^{500}$ to $\alpha^{515}$. The column vectors from $\alpha^{500}$ to $\alpha^{515}$ may also be generated by the rules (1) and (2) described above.

FIG. 12G illustrates a companion matrix $T^{65534}$. $T^{65534}$ may include column vectors of $\alpha^{65534}, \alpha^{65535}, \alpha^1, \ldots, \alpha^{14}$. $\alpha^{65535}$ having a value of (1, 0, 0, 0, 0, 0, 0, 0, 0, 0, 0, 0, 0, 0, 0, 0) and may be generated by shifting (1, 0, 1, 0, 0, 0, 0, 0, 0, 0, 0, 1, 0, 0, 0, 1) being a value of $\alpha^{65534}$ by 1 bit and by using the primitive polynomial $p(x)=x16+x^{12}+x^3+x^{1+1}$. $\alpha^{65535}$ is the last element of $GF(\alpha^{16})$ and is also expressed as $\alpha^{65535}=\alpha^0=1$. $\alpha^1$ may be generated by shifting $\alpha^{65535}$ by 1 bit.

The configuration of the H matrix for preventing the miscorrection will be described below.

When the number of bits of the data DATA is M bits, the number of bits of the error correction code ECC is 2N bits, and the symbol size is N bits, the H matrix may have a size of 2N*(M+2N). The H matrix may include an upper matrix having a size of N*(M+N) and a lower matrix having a size of N*(M+N). The following rules (a) and (b) may be applied to the upper matrix and the lower matrix.

Rule (a): The upper matrix may include (M+2N)/N identity matrices having a size of N*N. That is, the upper matrix may have a structure in which identity matrices are repeated. The upper matrix of the H matrix illustrated in FIG. 2 includes repeated identity matrices and a zero matrix, but differently from this, the upper matrix may have a structure in which only identity matrices are repeated without a zero matrix. By constructing the upper matrix as in the rule (a), the zero matrix is removed from the upper matrix, thereby preventing miscorrection from occurring in the error correction code ECC as illustrated in FIG. 8.

Rule (b): The lower matrix may include M/N $T^k$ companion matrices each having a size of N*N corresponding to the M-bit data. Here, k may have values different for each companion matrix, and the k values may be different from each other by N or more. The lower matrix may include a zero matrix having a size of N*N corresponding to a first half N-bit error correction code (hereinafter, referred to as a first error correction code) and an identity matrix having a size of N*N corresponding to a second half N-bit error correction code (hereinafter, referred to as a second error correction code) in a 2N-bit error correction code ECC. By constructing the lower matrix as in the rule (b), any overlapping column vector might not exist in a part of the lower matrix corresponding to the M-bit data, thereby preventing miscorrection from occurring in the data DATA as illustrated in FIG. 9.

FIG. 13 is an H matrix constructed according to the rules (a) and (b) in accordance with an embodiment of the present disclosure. the illustrated data is 512 bits, the error correction code is 32 bits, and the symbol size is 16 bits.

In FIG. 13, DS0 to DS31 may indicate 32 data DATA symbols (i.e., total 512 bits), and ES0 and ES1 may indicate two error correction code ECC symbols (i.e., total 32 bits).

Referring to FIG. 13, it may be seen that the upper matrix includes repeated identity matrices I each having a size of 16*16.

It may be seen that the lower matrix includes companion matrices $T^{8767}, T^{3899}, T^{41570}, \ldots, T^{43923}$ each having a size of 16*16 corresponding to the data part DS0 to DS31. Because the k values of the companion matrices are different from each other by 16 or more, there might not be overlapping column vectors in a part of the lower matrix corresponding to 512-bit data.

In addition, it may be seen that a part of the lower matrix corresponding to the first error correction code ES0 includes a zero matrix 0 having a size of 16*16 and a part of the lower matrix corresponding to the second error correction code ES1 includes an identity matrix I having a size of 16*16.

When the ECC engine 110 uses the H matrix that complies with the rules (a) and (b) as illustrated in FIG. 13, miscorrection may be prevented from occurring even when an error occurs in different symbols.

FIG. 14 is another H matrix constructed according to the rules (a) and (b) in accordance with an embodiment of the present disclosure. the illustrated data is 272 bits, the error correction code is 32 bits, and the symbol size is 16 bits.

In FIG. 14, DS0 to DS16 indicate 17 data DATA symbols (i.e., total 272 bits), and ES0 and ES1 may indicate two error correction code ECC symbols (i.e., total 32 bits).

Referring to FIG. 14, it may be seen that the upper matrix includes repeated identity matrices I each having a size of 16*16.

It may be seen that the lower matrix includes companion matrices $T^{9735}, T^{16884}, T^{55086}, \ldots, T^{60096}$ each having a size of 16*16 corresponding to the data part DS0 to DS16. Because the k values of the companion matrices are different from each other by 16 or more, there might not be overlapping column vectors in a part of the lower matrix corresponding to 272-bit data.

In may be seen that a part of the lower matrix corresponding to the first error correction code ES0 includes a zero matrix 0 having a size of 16*16 and a part of the lower matrix corresponding to the second error correction code ES1 includes an identity matrix I having a size of 16*16.

When the ECC engine 110 uses the H matrix that complies with the rules (a) and (b) as illustrated in FIG. 14, miscorrection may be prevented from occurring even when an error occurs in different symbols.

Although embodiments according to the technical idea of the present disclosure have been described above with reference to the accompanying drawings, this is only for describing the embodiments according to the concept of the present disclosure, and the present disclosure is not limited to the above embodiments. Various types of substitutions, modifications, and changes for the embodiments may be made by those skilled in the art, to which the present disclosure pertains, without departing from the technical idea of the present disclosure defined in the following claims, and it should be construed that these substitutions, modifications, and changes belong to the scope of the present disclosure. Furthermore, the embodiments may be combined to form additional embodiments.

What is claimed is:

1. A memory system comprising:
  a memory core; and
  an ECC engine configured to, during a write operation, perform a logical operation on an M-bit write data to be stored in the memory core and an H matrix, and generate an N-bit first error correction code and an N-bit second error correction code to be stored in the memory core together with the write data, where N is an integer of 2 or more and M is a multiple of N,
  wherein the H matrix comprises an upper matrix having a size of N*(M+2N) and a lower matrix having a size of N*(M+2N), and
  wherein the lower matrix comprises M/N $T^k$ companion matrices each having a size of N*N, and k of the $T^k$ companion matrices has values which are positive integers different by N or more for each companion matrix.

2. The memory system of claim 1, wherein the lower matrix further comprises a zero matrix having a size of N*N and an identity matrix having a size of N*N.

3. The memory system of claim 2, wherein, in the lower matrix, the $T^k$ companion matrices correspond to data, the zero matrix corresponds to the first error correction code, and the identity matrix corresponds to the second error correction code.

4. The memory system of claim 1, wherein the upper matrix comprises (M+2N)/N identity matrices each having a size of N*N.

5. The memory system of claim 4, wherein the ECC engine is configured to, during a read operation, perform a logical operation on read data read from the memory core, the first error correction code read from the memory core, the second error correction code read from the memory core, and the H matrix, and correct an error in the read data.

6. The memory system of claim 1, wherein each of the $T^k$ companion matrices comprises $\alpha^k$ to $\alpha^{k+n-1}$ column vectors, and $\alpha$ is a primitive element.

7. The memory system of claim 6, wherein the primitive element $\alpha$ is 2.

8. The memory system of claim 1, wherein the ECC engine is configured to perform a symbol-level error correction operation, and a size of a symbol is N bits.

9. A memory system comprising:
  a memory core; and
  an ECC engine configured to, during a write operation, perform a logical operation on an M-bit write data to be stored in the memory core and an H matrix, and generate a 16-bit first error correction code and a 16-bit second error correction code, where M is an integer that is a multiple of 16,
  wherein the H matrix comprises an upper matrix having a size of 16*(M+32) and a lower matrix having a size of 16*(M+32), and
  wherein the lower matrix comprises a zero matrix having a size of 16*16, an identity matrix having a size of 16*16, and M/16 $T^k$ companion matrices each having a size of 16*16, and k of the $T^k$ companion matrices has values which are positive integers different by 16 or more for each companion matrix.

10. The memory system of claim 9, wherein the upper matrix comprises (M/16+2) identity matrices each having a size of 16*16.

11. The memory system of claim 10, wherein, in the lower matrix, the $T^k$ companion matrices correspond to data, the zero matrix corresponds to the first error correction code, and the identity matrix corresponds to the second error correction code.

12. The memory system of claim 11, wherein the M is 512 or 256.

13. The memory system of claim 11, wherein the ECC engine is configured to, during a read operation, perform a logical operation on read data read from the memory core, the first error correction code read from the memory core, the second error correction code read from the memory core, and the H matrix, and correct an error in the read data.

* * * * *